No. 887,805. PATENTED MAY 19, 1908.
H. B. HIGGINS.
POSITION INDICATOR FOR GRAIN DISTRIBUTING DEVICES.
APPLICATION FILED MAR. 30, 1907.
2 SHEETS—SHEET 1.
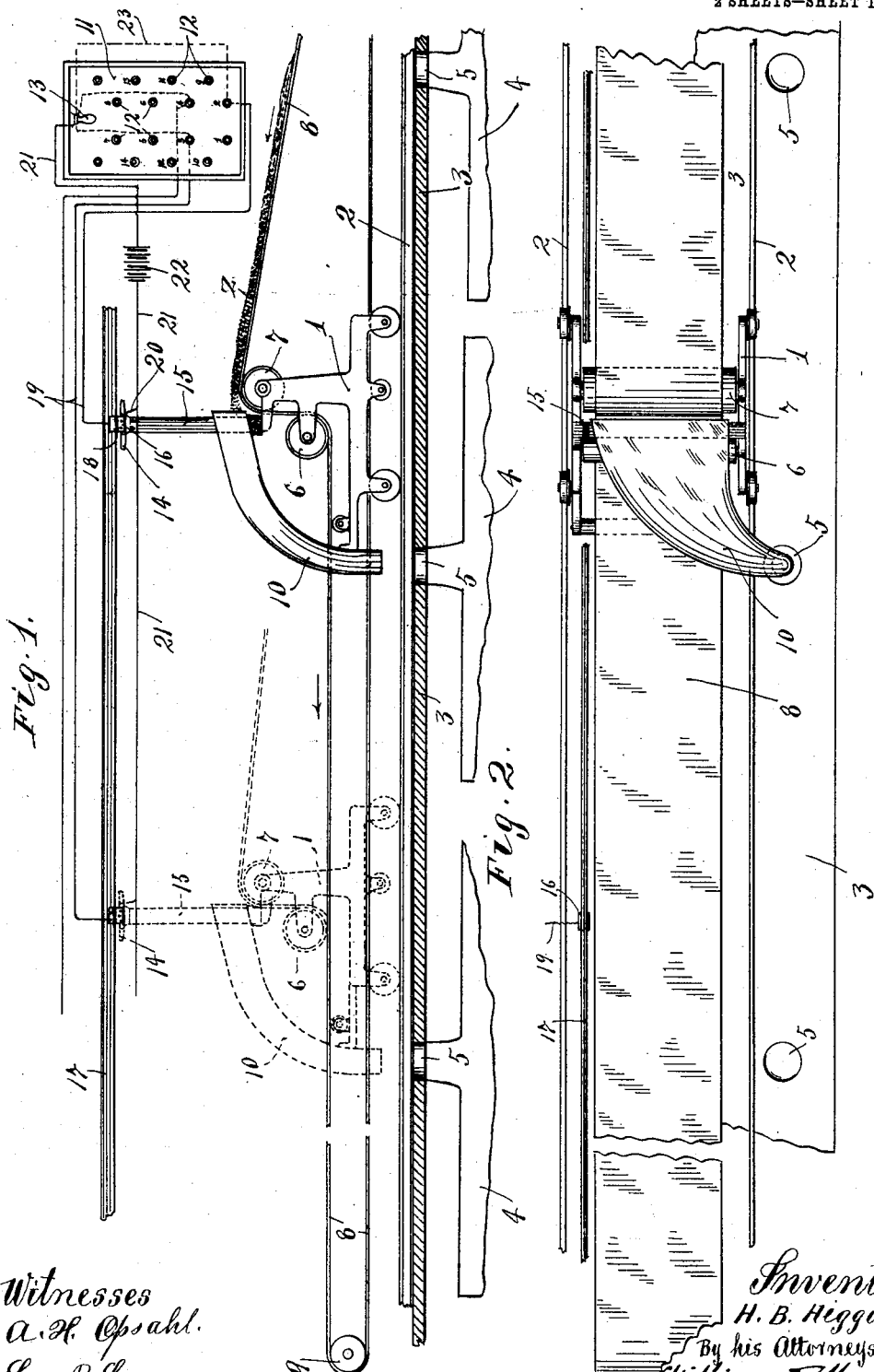
Witnesses
A. H. Opsahl.
Leon B. Losey.
Inventor.
H. B. Higgins.
By his Attorneys.

No. 887,805. PATENTED MAY 19, 1908.
H. B. HIGGINS.
POSITION INDICATOR FOR GRAIN DISTRIBUTING DEVICES.
APPLICATION FILED MAR. 30, 1907.
2 SHEETS—SHEET 2.
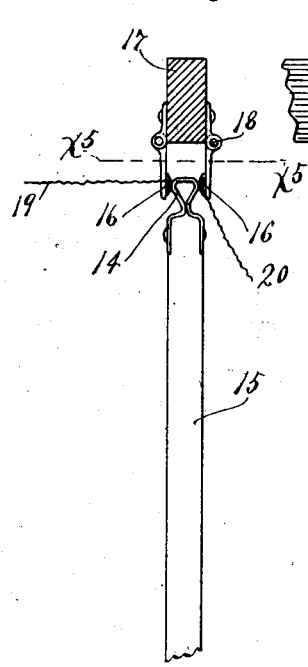
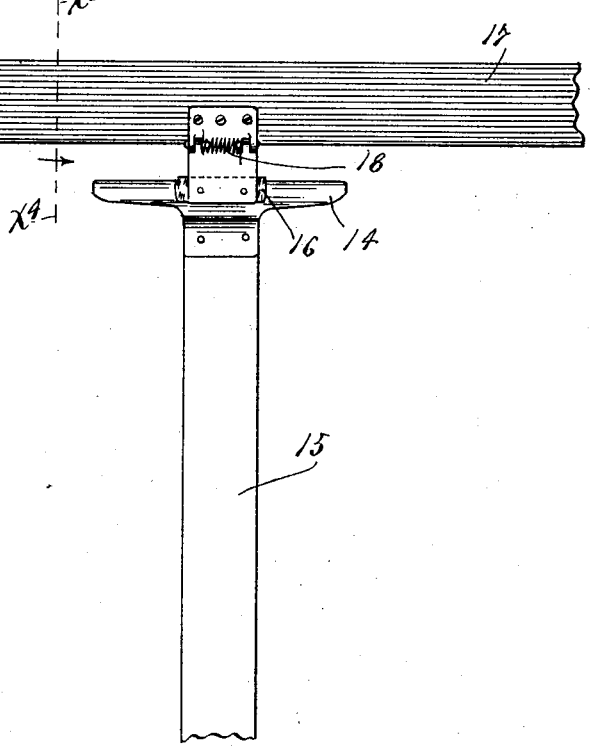
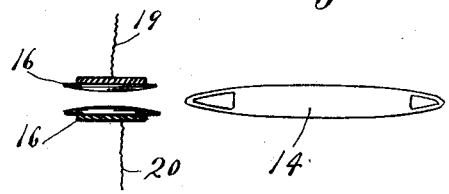
Witnesses.
A. H. Opsahl.
Leon B. Losey.
Inventor.
H. B. Higgins.
By his Attorneys
Williamson & Merchant
THE NORRIS PETERS CO., WASHINGTON, D. C.

UNITED STATES PATENT OFFICE.

HARRY B. HIGGINS, OF MINNEAPOLIS, MINNESOTA.

POSITION-INDICATOR FOR GRAIN-DISTRIBUTING DEVICES.

No. 887,805.  Specification of Letters Patent.  Patented May 19, 1908.

Application filed March 30, 1907. Serial No. 365,591

*To all whom it may concern:*

Be it known that I, HARRY B. HIGGINS, a citizen of the United States, residing at Minneapolis, in the county of Hennepin and State of Minnesota, have invented certain new and useful Improvements in Position-Indicators for Grain-Distributing Devices; and I do hereby declare the following to be a full, clear, and exact description of the invention, such as will enable others skilled in the art to which it appertains to make and use the same.

My invention has for its object to provide a simple and efficient so-called position indicator for grain delivering and distributing devices, especially such as used in grain storage elevators.

To the above ends the invention consists of the novel devices and combinations of devices hereinafter described and defined in the claims.

In the customary arrangement in grain storage elevators, the grain is elevated to the attic and is dropped into a so-called "garner" and from thence to the scales where it is weighed. From the scales the grain is delivered onto a long and approximately horizontal conveyer belt which runs in the gallery above the grain storage tanks or bins, and by a traveling device, usually designated as a tripper or dumper, the grain is directed from this conveyer belt into any desired one of the several tanks or bins. The movements and proper setting of the tripper for delivering from the conveyer belt to the bins is usually controlled by an assistant to the person in charge of the scales. This person in charge of the scales will instruct the assistant to set the tripper so as to deliver into some particular one of the several bins, and the assistant after he has set the tripper will, usually by means of a push bell, signal to the scale attendant and the latter will then turn on the grain from the scales to the conveyer belt. It frequently happens, however, that the assistant, because he has misunderstood or forgotten the order of the scale attendant, or because of carelessness, will set the tripper or dumper for delivery into the wrong bin and, of course, the signal which he sends by means of the push bell affords no means by which the scale attendant is able to determine whether or not the tripper has been properly set. Mistakes of this kind often result in the mixing of two different kinds of grain in a bin or tank. For instance, by such a mistake a car load of flax may be discharged into a bin or tank of wheat, thus commingling about a thousand bushels of flax with probably one hundred thousand bushels of wheat. As is evident, the separation of such a mixture is such an enormous task and incurs such expense that a thousand bushels of flax thus dumped into a large tank of wheat becomes practically a total loss to the owner of the elevator.

My invention provides a simple and efficient indicator by means of which the scale attendant may positively determine whether or not the tripper or other grain distributing device is properly positioned, and further, may determine this from his station at the scales and without personally inspecting the positioned tripper or distributing device.

It will, of course, be understood that my improved indicator is not limited to use in connection with the grain conveying and distributing device above briefly described, but is capable of use generally wherever a device of this kind is desirable, for the purpose of determining from a distant point the set position of the movable distributing device with respect to coöperating bins or receptacles.

In the accompanying drawings my improved indicator is shown as applied in connection with a grain conveying and distributing device of the character above briefly outlined.

In the drawings which illustrate the invention, like characters indicate like parts throughout the several views.

Referring to the drawings, Figure 1 is a view principally in elevation, but with some parts section, illustrating my invention as applied to a grain conveying and distributing mechanism of the character above outlined, some parts being broken away, some being shown in diagram, and some being removed. Fig. 2 is a plan view of most of the parts shown in Fig. 1, but with some parts removed and with some parts broken away. Fig. 3 is a detail view in side elevation, showing coöperating contacts of the electric circuit of the indicator. Fig. 4 is a vertical section taken on the line $x^4$ $x^4$ of Fig. 3; and Fig. 5 is a horizontal section taken on the line $x^5$ $x^5$ of Fig. 4, but illustrating different positions of the parts.

In the elevator construction illustrated in the drawings, the truck 1 of the so-called tripper or dumper is arranged to travel on rails 2 supported by the floor 3 of the elevator gallery. The floor 3 overlies the grain storage tanks or bins 4 and, as shown, is provided with spout openings 5 that open one into each of the said tanks or bins.

On the floor of the truck 1 is mounted a pair of pulleys 6 and 7, the latter of which is above the former. The grain conveying belt 8 runs under the pulley 6 and over the pulley 7, and at one extremity of its travel is passed over a pulley 9. At the other limit of its travel said conveyer belt 8 runs over a power driven pulley (not shown). The direction of travel of the said conveyer belt 8 is indicated by the arrow marked adjacent thereto in Fig. 1. The frame of the tripper truck 1 also carries a curved distributing spout 10, the expanded upper end of which stands in position to receive the grain that it delivered thereinto by that portion of the conveyer belt 8 which is passing over the pulley 7. Said conveyer belt 8 is driven at such speed that grain under its acquired inertia will continue on an approximately straight line from that portion of the belt which is passing over the pulley 7 and will thus be shot, as it were, into said distributing spout. The lower or delivery end of the said spout 10 stands in such position that it is, under traveling movement of the truck 1, adapted to be positioned over any one of the spout openings 5 to the tanks 4.

The usual means for imparting traveling motion to the tripper truck 1 and for locking the same in different positions may be provided, but the illustration of such means is not herein deemed necessary, because the same forms no part of the present invention.

My improved indicator as applied to the apparatus above described will now be considered:—At the desired point distant from the grain distributing mechanism to the bins or tanks, such, for instance, as a convenient place adjacent to the scales, there is provided a so-called indicator board 11 which supports a multiplicity of normally open circuit closing devices, such as push buttons 12. There should be one of these push buttons for each bin or tank 4, and these may be numbered or otherwise marked so as to identify them with the particular tanks or bins to which they correspond. In the vicinity of this indicator board there is provided an electrically actuated announcer, preferably in the form of a colored electric lamp 13.

Circuit connections are provided whereby when the tripper or distributer is properly positioned with respect to any particular tank or bin, and the corresponding push button is pressed and the circuit therefor closed, such fact will be indicated by the lamp or announcer 13.

The tripper truck 1 carries a circuit closing shoe or contact 14 which, as shown, is located above and rigidly supported from the said truck frame 1, by means of a pole 15. For each bin or tank 4 there is a pair of local contacts 16 between which the contact shoe 14 engages when the tripper is properly positioned for discharge into the corresponding tank or bin. These contacts 16 are preferably made up of hinged sections, the upper portions of which are secured to a wooden supporting rail 17 which, in turn, extends above but parallel with the rails 2 and is itself adjustably supported from the roof of the gallery. Coiled springs 18, shown as applied to the sections of the hinge-like contacts 16, at the hinged joints thereof, hold the lower sections of the said contacts for slight separating movements when the contact shoe 14 is forced between them. The said contact shoe, it will be noted, is pointed at both ends so that it will properly enter between the depending ends of the contacts 16.

The contacts 16 are insulated from each other by the wooden supporting rail 17. Those contacts 16 that are on one side of the said rail are connected by wires 19 to the corresponding push buttons 12, while those contacts 16 that are on the other side of said supporting rail 17 are connected by short wires 20 to a common return wire 21 in which is interposed a battery or other source of electrical energy 22. This common return wire 21 leads to the lamp 13, and from said lamp 13 branch wires 23 extend one to each of the push buttons 12. In Fig. 1, some of the wires 19 and 23 have been omitted for the sake of simplicity. It will, of course, be understood that the circuit is normally broken at the push buttons 12, between the corresponding wires 19 and 23. The character $z$ indicates the grain which is carried by the conveyer belt 8 and is being delivered into the distributing spout 10 of the tripper.

As shown in Fig. 1, the second bin toward the left is a bin corresponding to the push button adjacent to which on the indicator board 11 a small numeral 2 is marked. When the tripper stands in the position indicated by full lines in Fig. 1, its distributing spout 10 is in position to discharge into the inlet spout 5 of the said tank, whose indicator board number is 2, and in such position the circuit through the battery 22 and lamp 13 is closed at the contacts 14 and 16, but is still broken at the push button whose indicator board notation is 2. If now, when the parts are thus positioned and the assistant signals to the scale attendant that the tripper is properly set, the scale attendant may quickly determine whether or not the tripper is set at bin No. 2, simply by pushing on and closing the circuit at said push button; for, as is evident, the closing of the circuit at said push buttons, under these conditions, will result in a closed circuit through the lamp 13 and battery 22, with the result that the lamp will be lighted, whereas if the tripper were in another position the lamp would not be lighted, because the circuit would not have been closed by pressing on said push button No. 2. Otherwise stated, the circuit will be closed through the lamp only when the circuit is closed at a particular push button, and is also closed between the contacts 16 that correspond to a tank or bin to which the said pushed or closed button is assigned on the indicator board.

This indicator, therefore, affords positive means whereby the scale attendant may determine with certainty exactly where the tripper or grain distributing device is positioned with respect to the several tanks or bins.

The importance of a device of this character will be readily appreciated by all persons familiar with the distribution of grain in grain elevators and similar work.

What I claim is:

1. The combination with a multiplicity of laterally spaced storage bins or tanks and a horizontally movable distributing device arranged to deliver grain into any thereof, of a position indicator comprising an announcer located at a distant point, and coöperating announcer actuating devices, certain of which are controlled by said distributer and operate through said announcer to indicate the position of said distributer, substantially as described.

2. The combination with a multiplicity of laterally spaced storage bins or tanks and a horizontally movable distributing device arranged to deliver into any thereof, of an electrical position indicator comprising an announcer located at a distant point, circuit closing devices in the vicinity of said announcer, other circuit closing devices controlled by said distributer, and circuit connections between said announcer and the said two classes of circuit closing devices, whereby said announcer may be actuated by a closing of the circuit through the corresponding members of said two classes of circuit closing devices, substantially as described.

3. The combination with a multiplicity of laterally spaced storage bins or tanks and a horizontally movable distributer arranged to deliver into any thereof, of an electrical position indicator comprising an electric lamp and coöperating push buttons located at a distance from said bins and distributer, contacts controlled by said distributer, and circuit connections including said lamp, said normally open push buttons and said contacts, whereby said lamp will be actuated only when the circuit is closed through the same and through the push button and corresponding contacts, substantially as described.

4. The combination with a multiplicity of laterally spaced storage bins and a horizontally movable distributer arranged to deliver into any thereof, of an electric announcer and a multiplicity of circuit closing devices located at a distance from said bins and distributer, local contacts corresponding to the several bins, a coöperating movable contact carried by said distributer, and circuit connections between said local contacts, announcer and circuit closing devices, whereby said announcer may be actuated only when the circuit is closed, through the corresponding local contacts and circuit closing devices, substantially as described.

5. The combination with a multiplicity of laterally spaced storage bins or tanks, a feed belt and coöperating tripper, said tripper including a traveling truck and a distributing spout movable to deliver the grain from said conveyer belt into any one of said bins or tanks, of a position indicator comprising an announcer located at a point distant from said bins and tripper, a multiplicity of circuit closing devices adjacent to said announcer, local contacts arranged in pairs corresponding to the said bins or tanks, a contact shoe carried by said tripper and engageable, one at a time, with said pairs of local contacts, and circuit connections independent of said contact shoe including said local contacts, circuit closing devices and announcer, substantially as described.

6. The combination with a multiplicity of laterally spaced storage bins or tanks, a conveyer belt and coöperating tripper, said tripper comprising a traveling truck and a distributing spout movable to deliver into any one of said bins or tanks, an electric lamp and normally open push buttons located at a distance from said bins and tripper, local contacts arranged in pairs corresponding to said bins, a contact shoe carried by said tripper and engageable, one at a time, with said pairs of local contacts, and circuit connections between said local contacts, said push buttons and lamp, substantially as described.

In testimony whereof I affix my signature in presence of two witnesses.

HARRY B. HIGGINS.

Witnesses:
MALIE HOEL,
F. D. MERCHANT.